United States Patent [19]
Yokote et al.

[11] Patent Number: 5,328,950
[45] Date of Patent: Jul. 12, 1994

[54] POLYPROPYLENE RESIN COMPOSITIONS

[75] Inventors: Sachio Yokote; Yoichi Kawai; Masaki Misumi, all of Kanagawa, Japan

[73] Assignee: Mitsui Toatsu Chemicals, Inc., Tokyo, Japan

[21] Appl. No.: 24,858

[22] Filed: Feb. 26, 1993

Related U.S. Application Data

[62] Division of Ser. No. 655,353, Feb. 22, 1991, abandoned.

[30] Foreign Application Priority Data

Jul. 11, 1989 [JP] Japan ................................. 1-177024

[51] Int. Cl.$^5$ ................................................ C08K 5/52
[52] U.S. Cl. ..................................... 524/141; 524/117; 524/437; 524/430; 524/433
[58] Field of Search ................. 524/141, 117, 430, 433

[56] References Cited

U.S. PATENT DOCUMENTS
4,820,772  4/1989  Goto et al. .......................... 524/141

FOREIGN PATENT DOCUMENTS
61-53344  3/1986  Japan .
63-69854  3/1988  Japan .

*Primary Examiner*—Joseph L. Schofer
*Assistant Examiner*—Peter D. Mulcahy
*Attorney, Agent, or Firm*—Burns, Doane, Swecker & Mathis

[57] ABSTRACT

A polypropylene resin composition which is excellent in transparency and which shows very low pH reduction of the extract obtained in a promoted hot water-extraction test of a polypropylene resin which has been irradiated with radiant rays for sterilization. The polypropylene resin composition comprises 100 parts by weight of a polypropylene resin, 0.01 to 1.0 part by weight of a metal diarylphosphate represented by the following general formula (I):

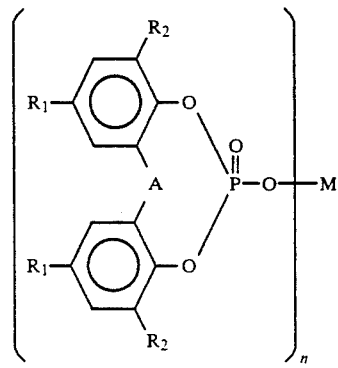

(wherein $R_1$ and $R_2$ each represents a hydrogen atom or an alkyl group; M represents an alkali metal or an alkaline earth metal; n is an integer of 1 or 2; and A represents an alkylidene group); and 0.001 to 1.0 part by weight of a hydroxide of an alkali metal, an alkaline earth metal or an element of the aluminum group. The polypropylene resin composition is suitable for use in making medical instruments, containers for foods or the like.

3 Claims, No Drawings

POLYPROPYLENE RESIN COMPOSITIONS

This application is a divisional, of application Ser. No. 07/655,353, filed Feb. 22, 1991, abandoned.

BACKGROUND OF THE INVENTION

1. Field of the Invention

The present invention relates to a polypropylene resin composition which is excellent in transparency and which shows very low pH reduction of an extract in a promoted hot water-extraction test of the polypropylene resin which has been irradiated with radiant rays for sterilization.

2. Description of the Related Art

Polypropylene resins are excellent in mechanical properties, heat resistance and resistance to chemicals as well as sanitary properties and hence have been widely used in various fields, for instance, containers for foods such as tablewares, containers for frozen desserts, trays, containers for fast-foods and containers for margarine; and medical instruments such as syringes of injectors, spitz tubes, containers for transfusion and cylinders.

However, it is important in the applications of the resins as containers for foods and medical instruments to permit the confirmation on whether the contents of a container are contaminated with dust or other foreign matter or not and it is not desirable that the color tone peculiar to the contents be changed when they are charged in a container.

For this reason, the use of polypropylene resin excellent in transparency has been needed in these applications.

There have widely been adopted a method in which a nucleating agent for crystallization is added as a means for improving the transparency of the polypropylene resins and, in general, a sorbitol derivative or a metal diarylphosphate is added as such a nucleating agent.

Among these sorbitol derivatives, those effective for improving the transparency of the polypropylene resins are, for instance, 1·3,2·4-dibenzylidene sorbitol, 1·3,2·4-di-(methylbenzylidene)sorbitol and 1·3,2·4-di-(ethylbenzylidene)sorbitol. Polypropylene resin compositions to which 1·3,2·4-di-(methylbenzylidene)sorbitol or 1·3,2·4-di-(ethylbenzylidene)sorbitol is added are excellent in transparency, but the sorbitol derivative is dissolved or dissipated in hot water when the resin compositions are immersed therein and floating matter is generated in the extract after it is cooled. This causes a safety and hygiene concerns.

On the other hand, the polypropylene resin composition to which 1·3,2·4-dibenzylidene sorbitol is added does not cause severe formation of floating matter in the extract obtained after immersing it in hot water when the resulting extract is cooled, but the transparency thereof is still insufficient.

Among metal diarylphosphates, those effective for improving the transparency of the polypropylene resins are, for instance, sodium 2,2'-methylenebis(4,6-di-t-butylphenyl) phosphate, lithium 2,2'-methylenebis(4,6-di-t-butylphenyl) phosphate, calcium di-(2,2'-methylenebis(4,6-di-t-butylphenyl)phosphate], sodium 2,2'-methylenebis(4-methyl-6-t-butylphenyl)phosphate and sodium 2,2'-methylenebis(4-ethyl-6-t-butylphenyl)-phosphate.

The polypropylene resin composition to which these metal diarylphosphates are added does not cause the formation of the foregoing floating matter in the extract obtained after immersing it in hot water when the resulting extract is cooled and has good transparency, but when the polypropylene resin composition is irradiated with radiant rays for sterilization thereof, a difference between pH values observed before and after the irradiation with radiant rays in the promoted hot water-extraction test and pH shows a substantial reduction after the irradiation with radiant rays. For this reason, a problem arises if the composition is used for making containers which are irradiated with radiant rays for sterilization and which accommodate aqueous solutions.

Thus, there has not yet been proposed any polypropylene resin compositions which has good transparency and simultaneously does not cause deterioration of contents to be accommodated.

OBJECTS AND SUMMARY OF THE INVENTION

The object of the present invention is to provide a polypropylene resin composition which is excellent in transparency and which is suitable for use in making a container inert to liquid contents to be accommodated therein after irradiation of the container with radiant rays for sterilization, i.e., which shows very low pH reduction of the extract obtained in a promoted hot water-extraction test of the polypropylene resin which has been irradiated with radiant rays for sterilization.

The inventors of this invention have conducted intensive studies to eliminate the foregoing drawbacks associated with the polypropylene resin composition to which a nucleating agent is added for improving the transparency thereof, have found out that it is effective to add a hydroxide of an alkali metal, an alkaline earth metal or an element of the aluminum group to a composition which comprises a polypropylene resin and a metal diarylphosphate and thus have completed the present invention.

As has been described above, there have been known that a metal diarylphosphate (see Japanese Patent Unexamined Publication (hereinafter referred to as "J.P. KOKAI") No. Sho 61-53344) or a combination of a metal diarylphosphate and a metal salt of a Group I element of Periodic Table or hydrotalcite (see J.P. KOKAI No. Sho 63-69853) is added in order to improve the transparency of the polypropylene resin. However, it has not been known that the substantial reduction in the pH value of the extract obtained in the promoted hot water extraction test of a polypropylene resin to which a metal diarylphosphate is added and which is irradiated with radiant rays can be improved by addition of a hydroxide of an alkali metal, an alkaline earth metal or an element of the aluminum group and this discovery can ensure a marked effect. A polypropylene resin composition which is excellent in transparency and which does not cause any deterioration of the liquid contents to be accommodated in a container made of the composition can be obtained on the basis of this finding. This would not be anticipated from any conventional knowledges at all.

The present invention, accordingly, relates to a polypropylene resin composition which comprises 100 parts by weight of a polypropylene resin, 0.01 to 1.0 part by weight of a metal diarylphosphate represented by the following general formula (I):

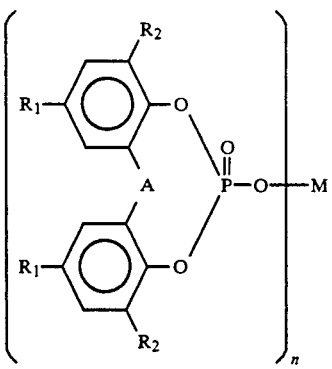

(wherein $R_1$ and $R_2$ each represents a hydrogen atom or an alkyl group; M represents an alkali metal or an alkaline earth metal; n is an integer of 1 or 2; and A represents an alkylidene group); and 0.001 to 1.0 part by weight of a hydroxide of an alkali metal, an alkaline earth metal or an element of the aluminum group.

DESCRIPTION OF THE PREFERRED EMBODIMENTS

The polypropylene resins used in the present invention may be, for instance, propylene homopolymer, propylene-ethylene copolymers, propylene-α-olefin copolymers or mixtures thereof. Particularly preferred polypropylene resins which can ensure the optimum effect of the present invention are propylene-ethylene random copolymers having an ethylene content ranging from 2 to 6% by weight.

If $R_1$ and $R_2$ in the metal diarylphosphate represented by the foregoing general formula (I) represent alkyl groups, specific examples thereof are methyl, ethyl, propyl, isopropyl, butyl, sec-butyl, tert-butyl, isobutyl, amyl, tert-amyl, hexyl, octyl and tert-octyl groups and examples of alkylidene groups represented by A are methylidene, ethylidene, butylidene and isopropylidene groups.

Examples of metals represented by M are sodium, potassium, lithium, calcium, magnesium and barium atoms.

The amount of the metal diarylphosphates represented by the general formula (I) to be added to the resin composition ranges from 0.01 to 1.0 part by weight and preferably 0.05 to 0.5 part by weight per 100 parts by weight of the polypropylene resin. This is because, if the amount of the metal diarylphosphate is less than 0.01 part by weight, the transparency of the resulting molded articles is not improved at all, while if it is more than 1.0 part by weight, the effect of the addition thereof is not greatly increased any more and the production cost is conversely increased.

Examples of the hydroxides of alkali metals, alkaline earth metals or elements of the aluminum group used in the present invention are lithium, sodium, potassium, magnesium, calcium, strontium, barium and aluminum. The amount of these hydroxides of alkali metals, alkaline earth metals or elements of the aluminum group ranges from 0,001 to 1.0 part by weight and preferably 0.01 to 0.5 part by weight per 100 parts by weight of the polypropylene resin. This is because, if the amount of these hydroxides is less than 0,001 part by weight, there cannot be ensured any effect of suppressing pH reduction of the extract obtained in the promoted hot water-extraction test of the resin after the irradiation of radiant rays, while if it is more than 1.0 part by weight, any significant increase in the effect cannot be expected and the transparency of the resulting composition is conversely reduced.

In the polypropylene resin composition of the present invention, the intended effect can be ensured by use of the metal diarylphosphate represented by the foregoing general formula (I) and the hydroxide in the amounts defined above respectively, but the amount of the hydroxide preferably ranges from 3 to 50% by weight with respect to that of the metal diarylphosphate represented by the general formula (I) and thus more excellent containers which do not cause any deterioration of liquid contents to be charged therein even after the containers are irradiated with radiant rays.

The resin composition of the present invention may, if necessary, comprise other additives such as antioxidants, light stabilizers, ultraviolet absorbers, pigments, dispersants and neutralizing agents. Examples of the antioxidants usable in the invention are tris(2,4-di-t-butylphenyl)phosphite, 2,6-di-t-butyl-p-methylphenol, n-octadecyl-3-(4-hydroxy-3,5-di-t-butylphenyl)propionate, tetrakis [methylene-3-(3,5-di-t-butyl-4-hydroxyphenyl) propionate]methane, pentaerythritol-tetrakis(β-laurylthiopropionate) and dilauryl thiopropionate.

Typical examples of the light stabilizers and ultraviolet absorbers are 2,2,6,6-tetramethyl-4-piperidyl benzoate, bis(2,2,6,6-tetramethyl-4-piperidyl)sebacate, 2-hydroxyl-4-n-octoxybenzophenone and 2-(2'-hydroxy-3,5-di-t-butylphenyl)-5-chlorobenzotriazole.

A peroxide may be added to control the melt flow index of the resin composition of the present invention to thus improve the moldability of the composition.

Typical examples of the peroxides used are 2,5-dimethyl-2,5-bis(t-butylperoxy)hexane, di-t-butyl perphthalate and benzoyl peroxide.

As the method for preparing the polypropylene resin composition of the present invention, there may be used a method which comprises mixing a polypropylene resin, a metal diarylphosphate represented by the general formula (I) and a hydroxide of an alkali metal, an alkaline earth metal or an element of the aluminum group as well as known additives which have been added to a polypropylene resin such as neutralizing agents, antioxidants, light stabilizers, ultraviolet absorbers and peroxides in a Henschel mixer or other blenders to uniformly disperse these components and then melting and extruding the resulting blend into pellets by an extruder.

The polypropylene resin composition according to the present invention does not cause generation of any floating matter in the extract obtained after hot water-extraction when the resulting extract is subsequently cooled, does not cause any significant pit reduction of the extract in the promoted hot water-extraction test even after irradiating the resin composition with radiant rays and is excellent in transparency. Therefore, it may be used in various fields such as medical instruments and packaging of foods without causing any problems of safety and hygiene.

The present invention will hereunder be explained in more detail by the following examples.

EXAMPLE 1

To 100 parts by weight of a powdery propylene-ethylene random copolymer (melt flow index as determined at 230° C. and under a load of 2.16 kg: 8 g/10min; ethylene content: 4.0% by weight), there were added 0.2 part by weight of sodium 2,2'-methylenebis(4,6-di-t-butylphenyl)phosphate, 0.03 part by weight of magnesium hydroxide, 0.1 part by weight of tris(2,4-di-t-butylphenyl)phosphite as an antioxidant and 0.04 part by weight of a dimethyl succinate·2-(4-hydroxy-2,2,6,6-tetramethyl-l-piperidyl)ethanol condensate as an ultraviolet absorber, followed by mixing in a Henschel mixer and extrusion of the mixture into pellets at an extrusion temperature of about 240° C. using the usual extruder. The pellets were irradiated with γ-rays at a dose of 2.5 Mrad to give a sample.

10 g each of pellets before and after the irradiation with γ-rays was immersed in 100 cc of pure water in an egg-plant type flask, boiled for 30 minutes and then removed by filtration to give a sample solution. Separately, pure water is boiled in another container for 30 minutes and was added to the sample solution obtained above for making up to thus form 100 cc of the sample solution. The filtrate was allowed to stand at room temperature for 3 hours. The pH of the solution was determined by a pH meter and the pH of the boiled pure water as a control sample was also determined simultaneously.

The results obtained are summarized in Table-1.

30 g of the pellets prior to the irradiation with γ-rays were immersed in 300 cc of pure water in an autoclave, allowed to stand at 121° C. for 3 hours, then the extract was withdrawn from the autoclave, filtered to remove the pellets, the filtrate was allowed to stand at ordinary temperature for 24 hours to examine whether floating matter was present in the filtrate.

The presence or absence of the floating matter was determined by visual observation and evaluated according to the following evaluation criteria:

○: no floating matter was observed.
Δ: floating matter was slightly present.
x: floating matter was observed.
x x: there was observed a large quantity of floating matter.

The results thus obtained are listed in Table-1.

In addition, the pellets prior to the irradiation with γ-rays were subjected to injection molding into a plate having a size of 160×80×2 mm at 210° C. by an injection molder and the haze of the resulting plate was determined by a haze meter.

The results thus obtained are also listed in Table-1.

EXAMPLE 2

The same procedures used in Example 1 were repeated except that the amount of sodium 2,2'-methylenebis(4,6-di-t-butylphenyl)phosphate was changed to 0.3 part by weight to obtain pellets and the properties of the product were likewise evaluated in the same manner used in Example 1.

The results thus obtained are listed in Table-1.

EXAMPLE 3

The same procedures used in Example 1 were repeated except that the amount of sodium 2,2'-methylenebis(4,6-di-t-butylphenyl)phosphate was changed to 0.4 part by weight to obtain pellets and the properties of the product were likewise evaluated in the same manner used in Example 1.

The results thus obtained are listed in Table-1.

EXAMPLE 4

The same procedures used in Example 2 were repeated except that 0.03 part by weight of aluminum hydroxide was substituted for 0.03 part by weight of magnesium hydroxide used in Example 2 to obtain pellets and the properties of the product were likewise evaluated in the same manner used in Example 1.

The results thus obtained are listed in Table-1.

EXAMPLE 5

The same procedures used in Example 2 were repeated except that 0.3 part by weight of lithium 2,2'-methylenebis(4,6-di-t-butylphenyl)phosphate was substituted for 0.3 part by weight of sodium 2,2'-methylenebis(4,6-di-t-butylphenyl)phosphate used in Example 2 to obtain pellets and the properties of the product were likewise evaluated in the same manner used in Example 1.

The results thus obtained are listed in Table-1.

EXAMPLE 6

Pellets obtained in the same manner used in Example 2 were formed into a plate having a size of 160×80×2 mm according to an injection molding method. The injection molding procedure was performed under conditions of a molding temperature of about 260° C. and a mold temperature of about 50° C. The plate was irradiated with γ-rays at a dose of 2.5 Mrad to give a sample.

Each plate-like sample obtained before or after the γ-rays irradiation was cut into pieces having a size of about 5 mm square and 10 g each of these pieces was used as a sample for measurements.

The same evaluations performed in Example 1 were carried out.

The results thus obtained are listed in Table-1.

EXAMPLE 7

Pellets obtained in the same manner used in Example 2 were formed into a syringe for an injector having an inner volume of 50 cc according to an injection molding method. The injection molding procedure was performed under conditions of a molding temperature of about 260° C. and a mold temperature of about 15° C. The syringe for an injector was irradiated with γ-rays at a dose of 2.5 Mrad to give a sample.

Each sample of syringe for an injector obtained before or after the γ-rays irradiation was cut into pieces having a size of about 5 mm square and 10 g each of these pieces was used as a sample for measurements.

The same evaluations performed in Example 1 were carried out.

The results thus obtained are listed in Table-1.

COMPARATIVE EXAMPLE 1

The same procedures used in Example 2 were repeated except that the amount of sodium 2,2'-methylenebis(4,6-di-t-butylphenyl)phosphate added was changed to 0.005 part by weight to obtain pellets. The same evaluations performed in Example 1 were carried out.

The results thus obtained are listed in Table-2.

The transparency of the resulting plate was lower than that attained by the composition of the present invention.

COMPARATIVE EXAMPLE 2

The same procedures used in Example 2 were repeated except that the amount of sodium 2,2'-methylenebis(4,6-di-t-butylphenyl)phosphate added was changed to 1.5 part by weight to obtain pellets. The same evaluations performed in Example 1 were carried out.

The results thus obtained are listed in Table-2.

The transparency and hot water extractability of the pellet as well as the pH reduction of the extract of the pellets obtained after irradiation of radiant rays and the hot water-extraction were equal to those attained by the composition of the present invention. This means that sodium 2,2'-methylenebis(4,6-di-t-butylphenyl)phosphate must not be added in an amount as much as that used in this Comparative Example.

COMPARATIVE EXAMPLE 3

The same procedures used in Example 2 were repeated except that the amount of magnesium hydroxide added was changed to 0.0005 part by weight to obtain pellets. The same evaluations performed in Example 1 were carried out.

The results thus obtained are listed in Table-2.

The pH reduction of the extract of the pellets obtained after irradiation of radiant rays and the hot water-extraction was greater than that attained by the composition of the present invention.

COMPARATIVE EXAMPLE 4

The same procedures used in Example 2 were repeated except that the amount of magnesium hydroxide added was changed to 1.5 part by weight to obtain pellets. The same evaluations performed in Example 1 were carried out.

The results thus obtained are listed in Table-2.

The transparency of the composition of this Comparative Example was lower than that attained by the composition of the present invention.

COMPARATIVE EXAMPLE 5

The same procedures used in Example 2 were repeated except that 0.07 part by weight of calcium stearate was substituted for 0.03 part by weight of magnesium hydroxide used in Example 2 to obtain pellets. The same evaluations performed in Example 1 were carried out.

The results thus obtained are listed in Table-2.

The reduction in pH of the extract of the pellets obtained after irradiation of radiant rays and the hot water-extraction was greater than that attained by the composition of the present invention.

COMPARATIVE EXAMPLE 6

The same procedures used in Example 2 were repeated except that 0 . 3 part by weight of sodium 2,2'-methylenebis(4,6-di-t-butylphenyl)phosphate was not added and that 0.07 part by weight of calcium stearate was substituted for 0.03 part by weight of magnesium hydroxide to obtain pellets. The same evaluations performed in Example 1 were carried out.

The results thus obtained are listed in Table-2.

The transparency of the composition of this Comparative Example was lower than that attained by the composition of the present invention.

COMPARATIVE EXAMPLE 7

The same procedures used in Example 2 were repeated except that 0.3 part by weight of sodium 2,2'-methylenebis-(4,6-di-t-butylphenyl)phosphate was not added to obtain pellets. The same evaluations performed in Example 1 were carried out.

The results thus obtained are listed in Table-2.

The transparency of the composition of this Comparative Example was inferior to that attained by the composition of the present invention.

COMPARATIVE EXAMPLE 8

The same procedures used in Example 2 were repeated except that 0.3 part by weight of 1·3,2·4-dibenzylidene sorbitol was substituted for 0.3 part by weight of sodium 2,2'-methylenebis(4,6-di-t-butylphenyl)phosphate and that 0.07 part by weight of calcium stearate was substituted for 0.03 part by weight of magnesium hydroxide to obtain pellets. The same evaluations performed in Example 1 were carried out.

The results thus obtained are listed in Table-2.

The transparency of the composition of this Comparative Example was inferior to that attained by the composition of the present invention and the composition of this Comparative Example slightly generated floating matter during the hot water-extraction.

COMPARATIVE EXAMPLE 9

The same procedures used in Example 2 were repeated except that 0.3 part by weight of 1·3,2·4-di(ethylbenzylidene)sorbitol was substituted for 0.3 part by weight of sodium 2,2'-methylenebis(4,6-di-t-butylphenyl) phosphate and that 0.07 part by weight of calcium stearate was substituted for 0.03 part by weight of magnesium hydroxide to obtain pellets. The same evaluations performed in Example 1 were carried out.

The results thus obtained are listed in Table-2.

The composition of this Comparative Example generated a large amount of floating matter during the hot water-extraction.

COMPARATIVE EXAMPLE 10

The same procedures used in Example 2 were repeated except that 0.05 part by weight of hydrotalcite (available from Kyowa Chemical Industry Co., Ltd. under the trade name of DHT 4A) was substituted for 0.03 part by weight of magnesium hydroxide to obtain pellets. The same evaluations performed in Example 1 were carried out.

The results thus obtained are listed in Table-2.

The reduction in pH of the extract of the pellets obtained after irradiation of radiant rays and the hot water-extraction was greater than that attained by the composition of the present invention.

COMPARATIVE EXAMPLE 11

The same procedures used in Example 2 were repeated except that 0.03 part by weight of sodium stearate was substituted for 0.03 part by weight of magnesium hydroxide to obtain pellets. The same evaluations performed in Example 1 were carried out.

The results thus obtained are listed in Table-2.

The reduction in pH of the extract of the pellets obtained after irradiation of radiant rays and the hot water-extraction was greater than that attained by the composition of the present invention.

The polypropylene resin composition of the present invention is excellent in transparency and has a low pH reduction of an extract obtained in a promoted hot water-extraction test performed by irradiating the polypropylene resin with radiant rays and then extracting with hot water. Therefore, the composition is very suitable for use in making medical instruments, containers for foods or the like.

TABLE 1

|  | Ex. No. | | | | | | |
|---|---|---|---|---|---|---|---|
|  | 1 | 2 | 3 | 4 | 5 | 6 | 7 |
| (i) Resin Composition (part) | | | | | | | |
| PP | 100 | 100 | 100 | 100 | 100 | 100 | 100 |
| Na 2,2'-methylenebis(4,6-di-t-butylphenyl)phosphate | 0.2 | 0.3 | 0.4 | 0.3 | — | 0.3 | 0.3 |
| Li 2,2'-methylenebis(4,6-di-t-butylphenyl)phosphate | — | — | — | — | 0.3 | — | — |
| magnesium hydroxide | 0.03 | 0.03 | 0.03 | — | 0.03 | 0.03 | 0.03 |
| aluminum hydroxide | — | — | — | 0.03 | — | — | — |
| (ii) Results of Evaluation | | | | | | | |
| Haze (%) | 17 | 14 | 13 | 14 | 17 | 14 | 14 |
| pH of Hot Water Extract | | | | | | | |
| Control Sample | 6.9 | 6.9 | 6.9 | 6.9 | 6.9 | 6.9 | 6.9 |
| Pellet Prior to Irradiation | 6.3 | 6.3 | 6.4 | 6.4 | 6.3 | 6.3 | 6.3 |
| Pellet After Irradiation | 5.7 | 5.8 | 5.9 | 6.0 | 5.7 | 5.9 | 5.9 |
| Hot Water Extractability | ○ | ○ | ○ | ○ | ○ | ○ | ○ |

TABLE 2

|  | Comparative Ex. No. | | | | | | | | | | |
|---|---|---|---|---|---|---|---|---|---|---|---|
|  | 1 | 2 | 3 | 4 | 5 | 6 | 7 | 8 | 9 | 10 | 11 |
| (i) Resin Composition (part) | | | | | | | | | | | |
| PP | 100 | 100 | 100 | 100 | 100 | 100 | 100 | 100 | 100 | 100 | 100 |
| Na 2,2'-methylenebis(4,6-di-t-butylphenyl)phosphate | 0.005 | 1.5 | 0.3 | 0.3 | 0.3 | — | — | — | — | 0.3 | 0.3 |
| 1.3,2.4-dibenzylidene sorbitol | — | — | — | — | — | — | — | 0.3 | — | — | — |
| 1.3,2.4-di(ethylbenzylidene)sorbitol | — | — | — | — | — | — | — | — | 0.3 | — | — |
| magnesium hydroxide | 0.03 | 0.03 | 0.0005 | 1.5 | — | — | 0.03 | — | — | — | — |
| hydrotalcite | — | — | — | — | — | — | — | — | — | 0.05 | — |
| sodium stearate | — | — | — | — | — | — | — | — | — | — | 0.03 |
| calcium stearate | — | — | — | — | 0.07 | 0.07 | — | 0.07 | 0.07 | — | — |
| (ii) Results of Evaluation | | | | | | | | | | | |
| Haze (%) | 61 | 13 | 14 | 30 | 14 | 63 | 63 | 25 | 12 | 18 | 17 |
| pH of Hot Water Extract | | | | | | | | | | | |
| Control Sample | 6.9 | 6.9 | 6.9 | 6.9 | 6.9 | 6.9 | 6.9 | 6.9 | 6.9 | 6.9 | 6.9 |
| Pellet Prior to Irradiation | 6.2 | 6.4 | 6.3 | 6.3 | 6.4 | 6.3 | 6.3 | 6.2 | 6.4 | 6.3 | 6.3 |
| Pellet After Irradiation | 6.0 | 5.8 | 4.2 | 5.9 | 4.1 | 5.4 | 5.8 | 5.5 | 5.7 | 4.0 | 4.0 |
| Hot Water Extractability | ○ | ○ | ○ | ○ | ○ | ○ | ○ | ○ | XXO | ○ | ○ |

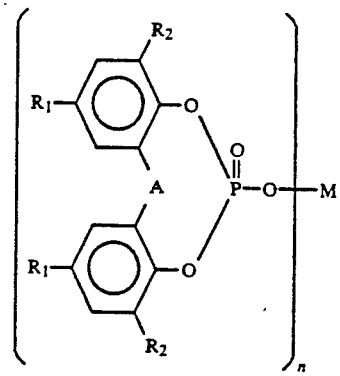

We claim:

1. A molded product which is irradiated with radiant rays for sterilization and which accommodates aqueous solutions, said molded product being made from a polypropylene resin composition comprising 100 parts by weight of a polypropylene resin, 0.01 to 1.0 part by weight of a metal diarylphosphate represented by the following general (I):

wherein $R_1$ and $R_2$ each represents a hydrogen atom or an alkyl group; M represents an alkali metal or an alkaline earth metal; n is an integer of 1 or 2; and A represents an alkylidene group; and 0.001 to 1.0 part by weight of a hydroxide of an alkali metal, a hydroxide of an alkaline earth metal or aluminum hydroxide, wherein said polypropylene resin composition inhibits the formation of floating matter in an extract obtained by immersing the polypropylene resin composition in hot water and cooling the extract and wherein the polypropylene resin composition upon irradiation with radiant rays for sterilization resists a reduction in pH of an extract obtained in a promoted hot water-extraction test.

2. The molded product of claim 1 wherein the molded product is a medical instrument.

3. The molded product of claim 1 wherein the molded product is a syringe for an injector.

* * * * *

UNITED STATES PATENT AND TRADEMARK OFFICE
CERTIFICATE OF CORRECTION

PATENT NO. : 5,328,950

DATED : July 12, 1994

INVENTOR(S) : Yokote et al.

It is certified that error appears in the above-identified patent and that said Letters Patent is hereby corrected as shown below:

On the title page, item [30]:

Under the heading "Foreign Application Priority Data", insert additional priority information as follows: --PCT/JP90/00891, filed July 11, 1990--.

In the Abstract, line 4 (after the formula), after "and" change "0,001" to --0.001--.

Claim 1, column 9, line 69, after "general" insert --formula--.

Signed and Sealed this

Seventh Day of March, 1995

Attest:

BRUCE LEHMAN

*Attesting Officer*     *Commissioner of Patents and Trademarks*